Sept. 6, 1927.
E. H. VAN VALKENBERG
1,641,306
ENGINE MOUNTING FOR AEROPLANES
Filed Oct. 23, 1926
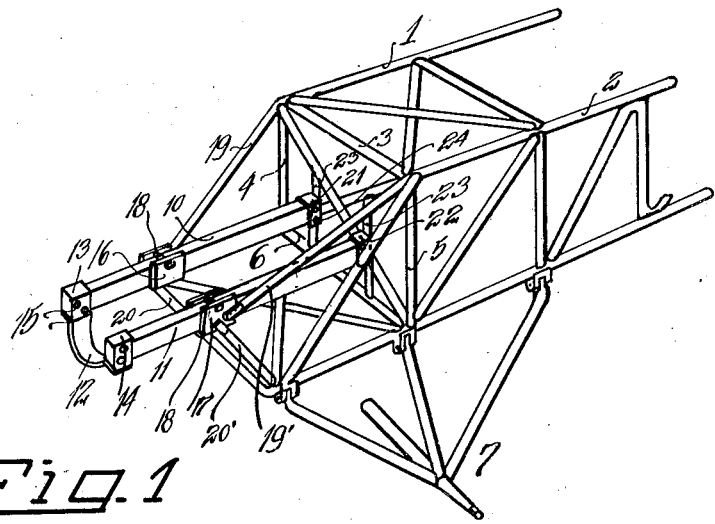
Fig.1
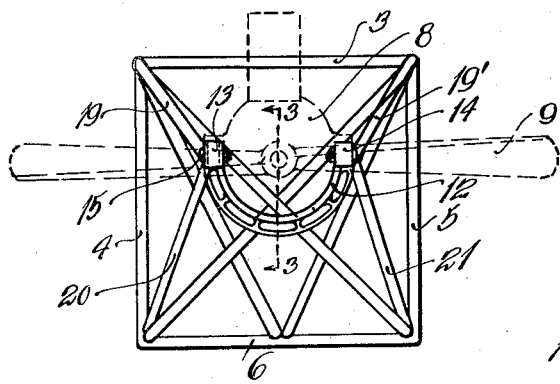
Fig.2
Fig.3
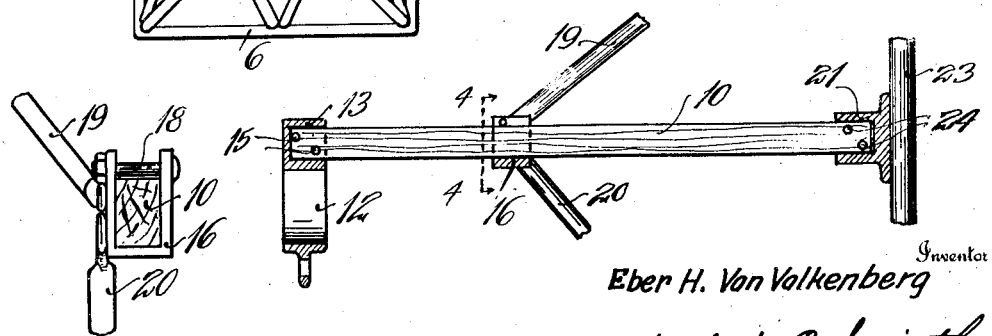
Fig.4
Inventor
Eber H. Van Valkenberg
By Herbert E Smith
Attorney Patented Sept. 6, 1927.

1,641,306

UNITED STATES PATENT OFFICE.

EBER HARLEY VAN VALKENBERG, OF McKEESPORT, PENNSYLVANIA, ASSIGNOR OF ONE-HALF TO OSCAR SILVERSTEIN, OF SPOKANE, WASHINGTON.

ENGINE MOUNTING FOR AEROPLANES.

Application filed October 23, 1926. Serial No. 143,625.

My present invention relates to improvements in engine mountings for aeroplanes which while herein shown as adapted for use with a single engine or power plant used in the propulsion of the aircraft, may also be adapted and used with other types of aeroplanes.

In the exemplification of the invention shown herein the engine mounting is employed at the front of the fuselage or body frame of the aeroplane, and used in connection with a removable nose or front end-piece of the body of the aircraft.

As is well known in the aircraft profession the necessity frequently arises for making immediate and rapid changes by removing one power plant or engine, and substituting therefor another power plant or engine. The primary object of my invention is the provision of an engine mounting or removable supporting frame or bed for the power plant, by means of which the latter may readily and quickly be assembled and placed in operative position with relation to the aircraft; which will provide the necessary substantial support for the power plant while in use, and which may with equal facility be removed from the aircraft when necessary.

The invention consists in certain novel combinations and arrangements of parts as will hereinafter be more fully described and claimed. In the accompanying drawings I have illustrated one complete example of the physical embodiment of my invention wherein the parts are combined and arranged according to one mode I have so far devised for the practical application of the principles of my invention.

Figure 1 is a perspective view of the front portion of the fuselage or body frame of an aeroplane and illustrating the engine bed or mounting of my invention attached thereto.

Figure 2 is a front elevation of the body frame showing the engine mounting in place and indicating the position and relation of the power plant and propeller by dotted lines.

Figure 3 is an enlarged vertical longitudinal sectional view of the engine mounting as at line 3—3 of Figure 2.

Figure 4 is a transverse sectional view at line 4—4 of Figure 3.

In order that the general arrangement and relation of parts may readily be understood I have shown in Figure 1 a portion of the body frame including a pair of longitudinal struts 1 and 2 and an upper cross bar 3. At the front of the body frame an extension is fashioned and includes the front diagonal braces 4 and 5 and the bottom cross bar 6. The landing gear, or a portion thereof is indicated at 7, and located beneath the front of the body portion to reinforce the structure. In Figure 2 the power plant 8 and the propeller 9 are indicated by dotted lines, the former being attached in usual or suitable manner to the two sills 10 and 11 of the engine mounting.

These sills 10 and 11 as shown may be of wood and rectangular in cross section, or they may be fashioned of other suitable material and in desired shape. The sills extend longitudinally of the body frame and are supported in the front extension of the body frame. At their front ends these sills are rigidly joined by a downwardly curved metallic yoke 12 which is fashioned with end caps 13 and 14 that fit over the respective ends of the sills 10 and 11. Bolts 15 are passed through the walls of the end caps and the sills to securely attach the yoke and its caps to the sills and provide a rigid front cross member for the sills.

The two sills are supported at the front of the extension frame by means of a pair of U-plates 16 and 17, and each plate has a tie bolt 18 extending across the upper face of a sill to retain it in place in its U-plate. These U-plates are supported by a pair of complementary upper braces 19 and 19', and a complementary pair of lower diagonal braces 20 and 20', and these braces form parts of the front extension frame.

The sills with the motor plant or engine attached thereto are slid along in the spaced U-plates, to and from operative position. At their rear ends the two sills are supported in place by means of a complementary pair of socket heads 21 and 22 in which the respective ends of the sills are seated. These socket heads are attached to uprights 23 forming part of the front extension frame, and bolts 24 are passed through the socket heads and the ends of the sills to rigidly secure the sills in the socket heads.

It will be apparent that the motor plant or engine while mounted on the two sills may be located in position by sliding the sills through the U-plates and inserting the ends of the sills in the socket heads 21 and 22. Then the tie bolts 18 and 24 are secured in position and the engine mounting is thus with facility and rapidity placed in operative position for use. The engine mounting may with equal facility be released from its locked position and withdrawn when desired.

Having thus fully described my invention what I claim as new and desire to secure by Letters Patent is:

1. The combination with a body frame of an aeroplane, of a pair of longitudinal sills having a rigid front connection and forming a removable engine mounting, rear supports fixed to said frame for the sills and separable means for securing the sills and supports, a front extension on the body frame, fixed supports on said extension for the sills intermediate their ends, and separable retaining means in said fixed supports for the sills.

2. The combination with the body frame of an aeroplane, a pair of U-plates, and a pair of rear socket heads supported in said frame, of a pair of longitudinally disposed sills supported in said plates and socket heads, and attaching means for said sills.

3. The combination with a pair of U-shaped supporting plates and a pair of socket heads, of a pair of longitudinal sills having a front end yoke and attaching caps on said yoke, and tie bolts for securing said sills in the U-plates and socket heads.

In testimony whereof I affix my signature.

EBER HARLEY VAN VALKENBERG.